United States Patent
Cha et al.

(10) Patent No.: US 9,669,769 B2
(45) Date of Patent: Jun. 6, 2017

(54) BICYCLE CARRIER SYSTEM FOR VEHICLES

(71) Applicant: Hyundai Motor Company, Seoul (KR)

(72) Inventors: Dong Eun Cha, Whasung-Si (KR); Jin Young Yoon, Whasung-Si (KR); Seung Mok Lee, Whasung-Si (KR); Hyun Gyung Kim, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/946,687

(22) Filed: Nov. 19, 2015

(65) Prior Publication Data

US 2017/0072868 A1  Mar. 16, 2017

(30) Foreign Application Priority Data

Sep. 11, 2015 (KR) .................. 10-2015-0129042

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC ....... B60R 9/06; B60R 9/10; B60R 2011/008; B60R 2011/0082
See application file for complete search history.

(56) References Cited

U.S. PATENT DOCUMENTS

| 6,575,509 B1* | 6/2003 | Golden | B60R 19/38 293/106 |
| 7,909,213 B2* | 3/2011 | Bergerhoff | B60R 9/10 224/197 |
| 9,376,062 B2* | 6/2016 | Cha | B60R 9/06 |
| 2008/0007040 A1* | 1/2008 | Maucher | B60R 9/10 280/769 |
| 2011/0049207 A1* | 3/2011 | Hufgard | B60P 3/07 224/510 |
| 2013/0182454 A1* | 7/2013 | Hofmann | B60R 9/10 362/549 |

(Continued)

FOREIGN PATENT DOCUMENTS

| EP | 2 671 757 A1 | 12/2013 |
| EP | 2 570 305 B1 | 4/2014 |
| KR | 10-0666275 B1 | 1/2007 |

(Continued)

*Primary Examiner* — Brian Swenson
(74) *Attorney, Agent, or Firm* — Morgan, Lewis & Bockius LLP

(57) ABSTRACT

A bicycle carrier system for vehicles may include guide rails provided on a bumper back beam, a carrier device connected to the guide rails and configured to slide along the guide rails to be withdrawn from and received in the bumper back beam, a first driving device disposed on the carrier device and connected to the guide rails to move the carrier device along the guide rails, tilting devices configured to selectively connect the guide rails and the carrier device to each other and to release connection between the guide rails and the carrier device so as to tilt the carrier device from the guide rails when the carrier device is moved to a designated level or higher during withdrawal of the carrier device according to operation of the first driving device, and a communication control module.

17 Claims, 7 Drawing Sheets

(56) References Cited

U.S. PATENT DOCUMENTS

2016/0101740 A1* 4/2016 Patton ..................... B60P 3/077
                                                       414/462

FOREIGN PATENT DOCUMENTS

| KR | 10-0773082 B1 | 11/2007 |
| KR | 10-2009-0092206 A | 8/2009 |
| KR | 10-2011-0034733 A | 4/2011 |
| KR | 10-2011-0035378 A | 4/2011 |

* cited by examiner

BICYCLE CARRIER SYSTEM FOR VEHICLES

CROSS-REFERENCE TO RELATED APPLICATION

The present application claims priority to Korean Patent Application No. 10-2015-0129042, filed Sep. 11, 2015, the entire contents of which is incorporated herein for all purposes by this reference.

BACKGROUND OF THE INVENTION

Field of the Invention

The present invention relates to a bicycle carrier system for vehicles which is installed at a rear bumper of a vehicle to load a bicycle and baggage thereon.

Description of Related Art

Recently, as bicycles are used as means of leisure, and in order to move a bicycle to a bicycle road or an area around a mountain, the bicycle is loaded on a vehicle.

However, since a bicycle generally has a large volume, it is difficult to load the bicycle in a trunk or on a rear seat of a vehicle.

In order to solve such a problem, various plans to load a bicycle on the outer surface of a vehicle have been proposed. In the case that a bicycle is fixed to a vehicle roof panel, loading may be very inconvenient, and a vehicle height may be increased and, thus, when the vehicle enters a tunnel or a building, the bicycle may strike the tunnel or the building and cause accidents.

In the case that a bicycle is loaded on the rear end of a tailgate of a vehicle, a separate carrier device needs to be installed at the tailgate and, even at normal times when the bicycle is not loaded on the tailgate, the carrier device is exposed to the outside and may thus detract from the aesthetics of the vehicle.

Further, if it is necessary to load a bicycle on a vehicle, the carrier device is manually installed directly at the vehicle and, if it is not necessary to load the bicycle on the vehicle, the carrier device is separated from the vehicle, thus causing inconvenience.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a bicycle carrier system for vehicles in which a carrier device is installed at a bumper back beam of the rear part of a vehicle so as not to be exposed to the outside at normal times, is withdrawn from the bumper back beam so as to load a bicycle thereon, if it is necessary to load the carrier device with a bicycle, and thus maintains the external design of the vehicle at normal times and improves convenience.

Additionally, various aspects of the present invention are directed to providing a bicycle carrier system for vehicles in which a carrier device is automatically withdrawn from and inserted in a bumper back beam and automatically tilted so as to easily load a bicycle thereon, and thus improves quality and convenience.

According to various aspects of the present invention, a bicycle carrier system for vehicles may include guide rails provided on a bumper back beam so as to be symmetrical to each other and extending in the forward and backward directions, a carrier device connected to the guide rails and configured to slide along the guide rails to be withdrawn from and received in the bumper back beam, a first driving device disposed on the carrier device and connected to the guide rails to move the carrier device along the guide rails in the forward and backward directions, tilting devices configured to selectively connect the guide rails and the carrier device to each other and to release connection between the guide rails and the carrier device so as to tilt the carrier device from the guide rails when the carrier device is moved to a designated level or higher during withdrawal of the carrier device according to operation of the first driving device, and a communication control module to store instructions to withdraw the carrier device from the bumper back beam, instructions to receive the carrier device in the bumper back beam and instructions to tilt the carrier device and, when a signal indicating specific instructions is received, to operate the first driving device according to the received signal so as to execute withdrawal, receipt and tilting of the carrier device.

The guide rails extending in the forward and backward directions may be provided on the bumper back beam, and the carrier device may include a panel part and side rails connected to the guide rails so as to be slidable and may be configured to be withdrawn from and received in the bumper back beam along the guide rails.

The first driving device may include a motor part disposed at a front end of the carrier device and configured to transmit rotation power, and a moving link part extending from the motor part towards the guide rails, such that extending ends of the moving link part are connected to the guide rails, and configured to slide the carrier device along the guide rails in the forward and backward directions when the motor part is operated.

Pinion gears may be formed at extending ends of the moving link part and rack gears extending in the forward and backward directions are formed on the guide rails such that the pinion gears are engaged with the rack gears.

The tilting device may include a fixing bracket fixed to a rear end of the guide rail and including a fixing member elastically supported in the backward direction, and a tilting bracket disposed on the guide rail at a rear of the fixing bracket, such that rotation of the tilting bracket is restricted by inserting the fixing member into the tilting bracket, and including a tilting device configured to push the inserted fixing member in connection with movement of the carrier device so as to separate the fixing member from the tilting bracket.

A guide pin extending in the forward and backward directions may be fixed to the fixing bracket, an elastic spring may be provided on the guide pin, and the guide pin may pass through and may be connected to the fixing member so as to be elastically supported by the elastic spring.

A tilting lever extending in a sideways direction may be provided at a front end of the carrier device, and the tilting device may include a rotary lever disposed at a hinge pin fixed to the tilting bracket so as to be rotatable and including a push part protruding and contacting the tilting lever when the carrier device is withdrawn, and a rotary link having a first end connected to the rotary lever and a second end extending forwards and corresponding to the fixing member.

A spiral spring having a first end connected to the hinge pin and a second end connected to an inner surface of the rotary lever may be provided within the rotary lever.

A first end of the rotary link may be connected to the rotary lever so as to be rotatable and an operating pin corresponding to the fixing member may be hinged to a second end of the rotary link.

The operating pin of the rotary link may be provided such that an inserted state of the operating pin into the front end of the tilting bracket may be maintained.

The tilting device may further include a guide bracket having a first end disposed on the tilting bracket so as to be rotatable and a second end fixed to the fixing bracket, and including a guide hole extending in a direction of the tilting of the carrier device, and a fixing pin may protrude from a side surface of the tilting bracket and may be inserted into the guide hole of the guide bracket.

The communication control module may be configured to control the first driving device so as to move the carrier device before the tilting lever of the carrier device contacts the rotary lever of the tilting device when a signal indicating the instructions to withdraw the carrier device from the bumper back beam is received.

The communication control module may be configured to control the first driving device in the withdrawn state of the carrier device so as to further move the carrier device when a signal indicating the instructions to tilt the carrier device is received, and thus, the tilting lever of the carrier device pushes the rotary lever of the tilting device and moves the fixing member.

The bicycle carrier system for vehicles may further include an expandable support device disposed on the carrier device so as to expand in both sideways directions and to return to its original state such that a bicycle may be loaded thereon, and a second driving device connected to the expandable support device to expand the expandable support device.

The expandable support device may include an expansion rail extending in both sideways directions of the carrier device and fixed, bicycle supporters disposed on the expansion rail and sliding, and an expansion link part extending in parallel with the expansion rail such that the bicycle supporters are connected to the expansion link part to be movable in the extending direction, and connected to the second driving device such that, during operation of the second driving device, the bicycle supporters move along the expansion rail.

The communication control module may store instructions to expand the expandable support device and instructions to return the expandable support device to an original position thereof and, when a signal indicating instructions to expand the expandable support device is received, the communication control module may be configured to control the second driving device so as to expand and develop the expandable support device.

The communication control module may include a communication device configured to output a signal according to specific instructions regarding the carrier device, and a controller configured to receive the signal output from the communication device and to selectively apply power to the first driving device according to the received signal.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
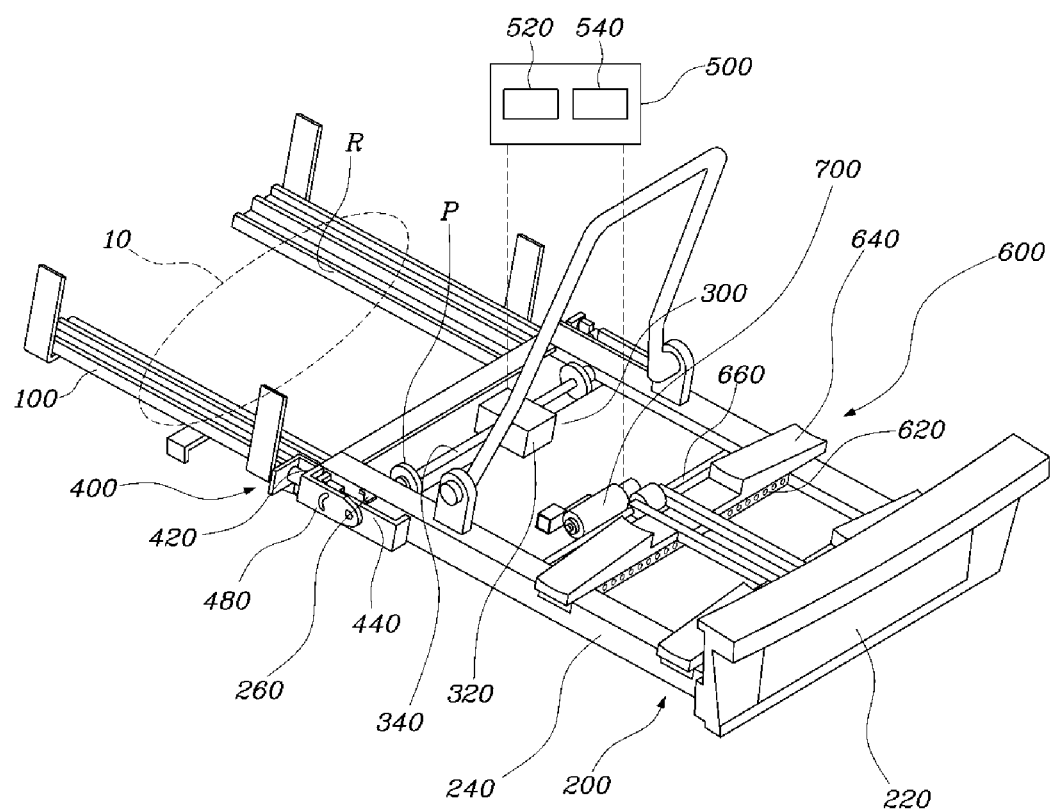
FIG. 1 is a view illustrating the configuration of an exemplary bicycle carrier system for vehicles in accordance with the present invention.

FIG. 1 is a view illustrating the configuration of a bicycle carrier system for vehicles in accordance with various embodiments of the present invention and FIGS. 2 to 7 are views illustrating the bicycle carrier system for vehicles shown in FIG. 1.

Figure 2:
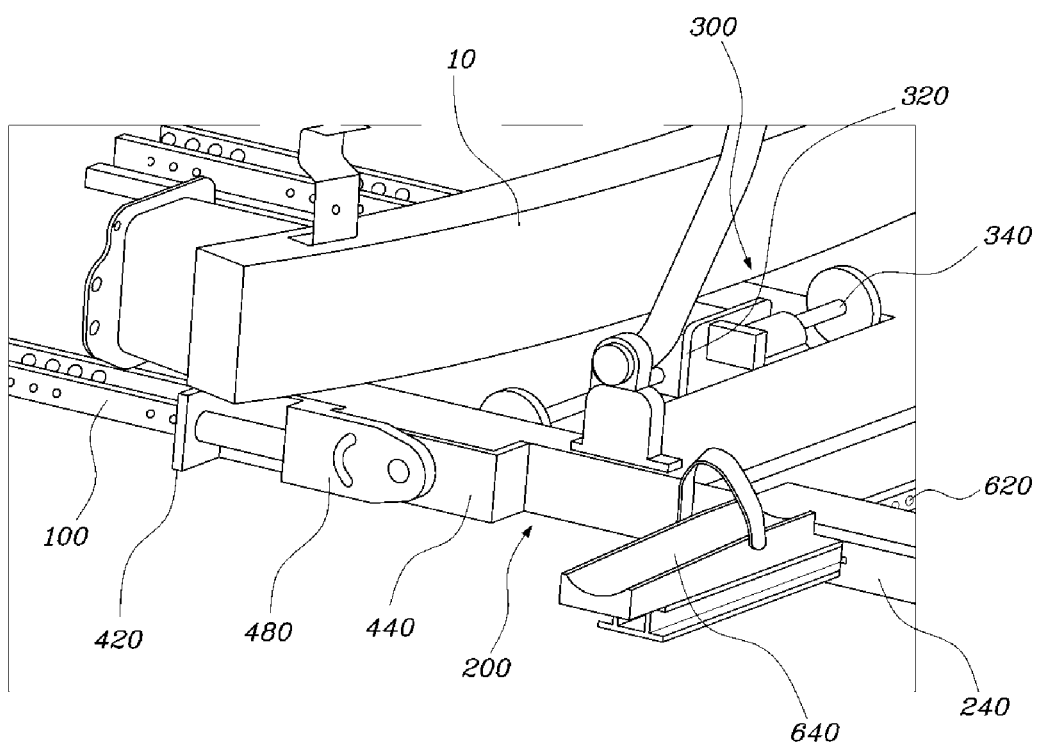
FIG. 2, FIG. 3, FIG. 4, FIG. 5, FIG. 6, and FIG. 7 are views illustrating the bicycle carrier system for vehicles shown in FIG. 1.

As exemplarily shown in FIGS. 1 and 2, the bicycle carrier system for vehicles includes guide rails 100 provided on a bumper back beam 10 so as to be symmetrical to each other and extending in the forward and backward directions, a carrier device 200 connected to the guide rails 100 and sliding along the guide rails 100 to be withdrawn from the bumper back beam 10 and received in the bumper back beam 10, a first driving device 300 installed on the carrier device 200, connected to the guide rails 100 and moving the carrier device 200 along the guide rails 100 in the forward and backward directions, tilting devices 400 selectively connecting the guide rails 100 and the carrier device 200 to each other and releasing connection between the guide rails 100 and the carrier device 200 so as to tilt the carrier device 200 from the guide rails 100 if the carrier device 200 is moved to a designated level or more during withdrawal of the carrier device 200 according to operation of the first driving device 200, and a communication control module 500 storing instructions to withdraw from the bumper back beam 10, instructions to receive the carrier device 200 in the bumper back beam 10 and instructions to tilt the carrier device 200 and, if a signal indicating specific instructions is received, operating the first driving device 300 according to the received signal so as to execute withdrawal, receipt and tilting of the carrier device 200.

The bicycle carrier system in accordance with the present invention may be installed on the bumper back beam 10 of the rear part of the vehicle and be configured so as to be withdrawn from and received in the bumper back beam 10 or to be withdrawn from and received in a region under the bumper back beam 10. Further, the tilting devices 400 are provided to tilt the carrier device 200 after withdrawal of the carrier device 200 so that a bicycle may be easily loaded on the carrier device 20. Further, the bicycle carrier system for vehicles further includes an expandable support device 600 to expand the carrier device 200, which will be described below, sideways after withdrawal of the carrier device 200.

Particularly, in the present invention, the first driving device 300 to move the carrier device 200 is controlled by the communication control module 500, and the communication control module 500 selectively operates the first driving device 300 according to specific instructions from a user and thus withdraws or receives the carrier device 200 from or in the bumper back beam 10 or tilts the carrier device 200. Here, the communication control module 500 is a wireless communication device and, particularly, a Bluetooth communication system may be used as the communication control module 500. Further, as exemplarily shown in FIG. 7, the communication control module 500 may be provided with a control device to receive specific instructions. When a user inputs specific instructions to withdraw or receive the carrier device 200 from or in the bumper back beam 10 or to tilt the carrier device 200 through the control device, the communication control module 500 operates the first driving device 300 or a second driving device 700 according to the corresponding instructions, thereby automatically moving or tilting the carrier device 200.

Therefore, when the bicycle carrier system is used, a user may input simple instructions, thereby causing the carrier device 200 to be automatically withdrawn from or received in the bumper back beam 10 or to be automatically tilted in the withdrawn state.

Now, the present invention will be described in more detail. As exemplarily shown in FIGS. 1 and 2, the guide rails 100 extending in the forward and backward directions may be provided on the bumper back beam 10, and the carrier device 200 may include a panel part 220 and side rails 240 connected to the guide rails 100 so as to be slidable and be withdrawn from and received in the bumper back beam 10 along the guide rails 100.

Here, the first driving device 300 may include a motor part 320 installed at the front end of the carrier device 200 and transmitting rotation power, and a moving link part 340 extending from the motor part 320 towards the guide rails 100, such that extending ends of the moving link part 340 are connected to the guide rails 100, and sliding the carrier device 200 along the guide rails 100 in the forward and backward directions when the motor part 320 is operated.

Pinion gears P may be formed at the extending ends of the moving link part 340 and rack gears R extending in the forward and backward directions may be formed on the guide rails 100 such that the pinion gears P are engaged with the rack gears R.

That is, the moving link part 340 extends from the motor part 320 to both sides of the carrier device 200 and is rotated when the motor part 320 is operated. The pinion gears P engaged with the rack gears R formed on the guide rails 100 are formed at the extending ends of the moving link part 340 and, when the motor part 320 is operated, the moving link part 340 is rotated and the pinion gears P are rotated and moved along the rack gears R.

Figure 3:
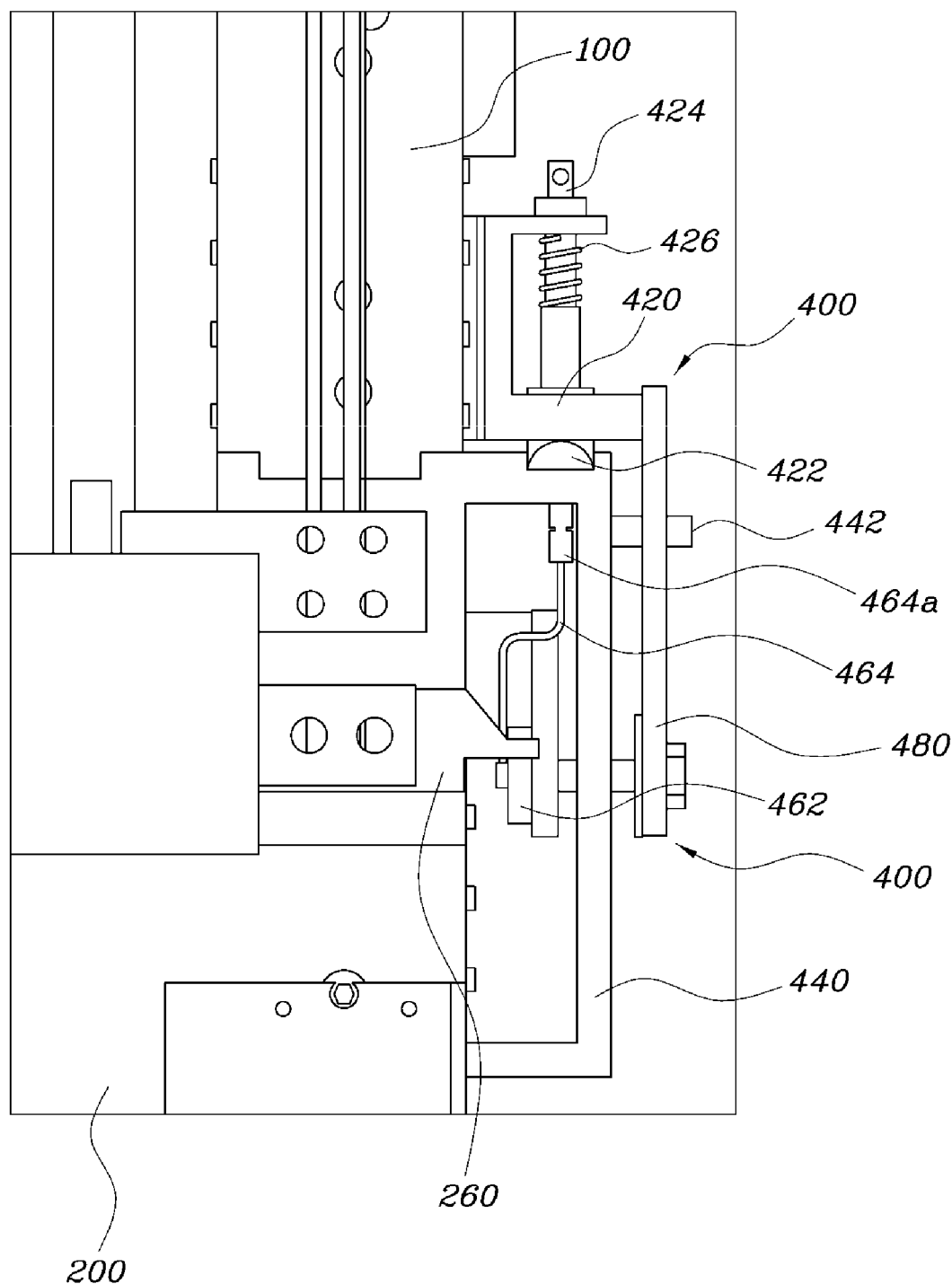
Figure 4:
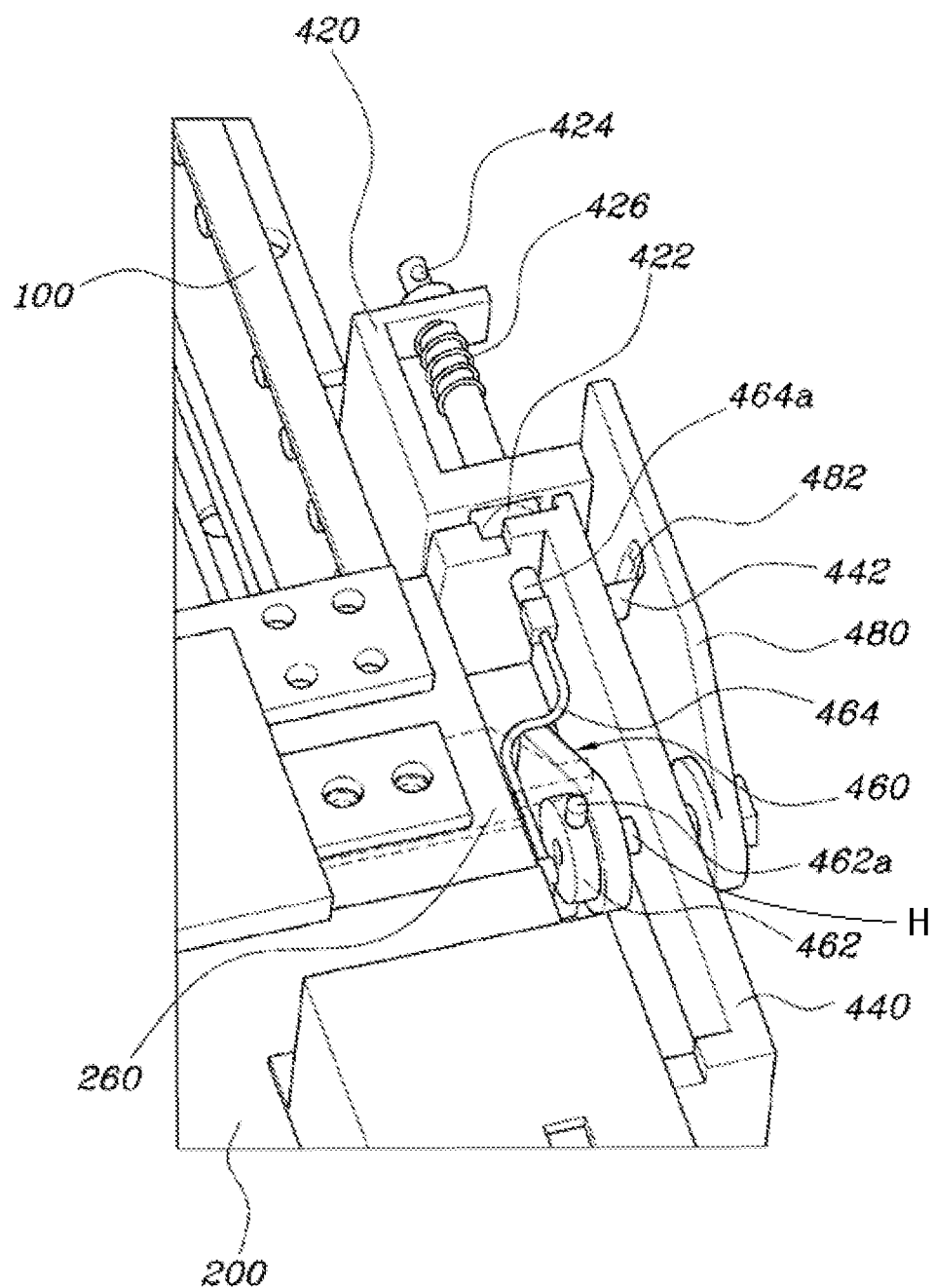
Figure 5:
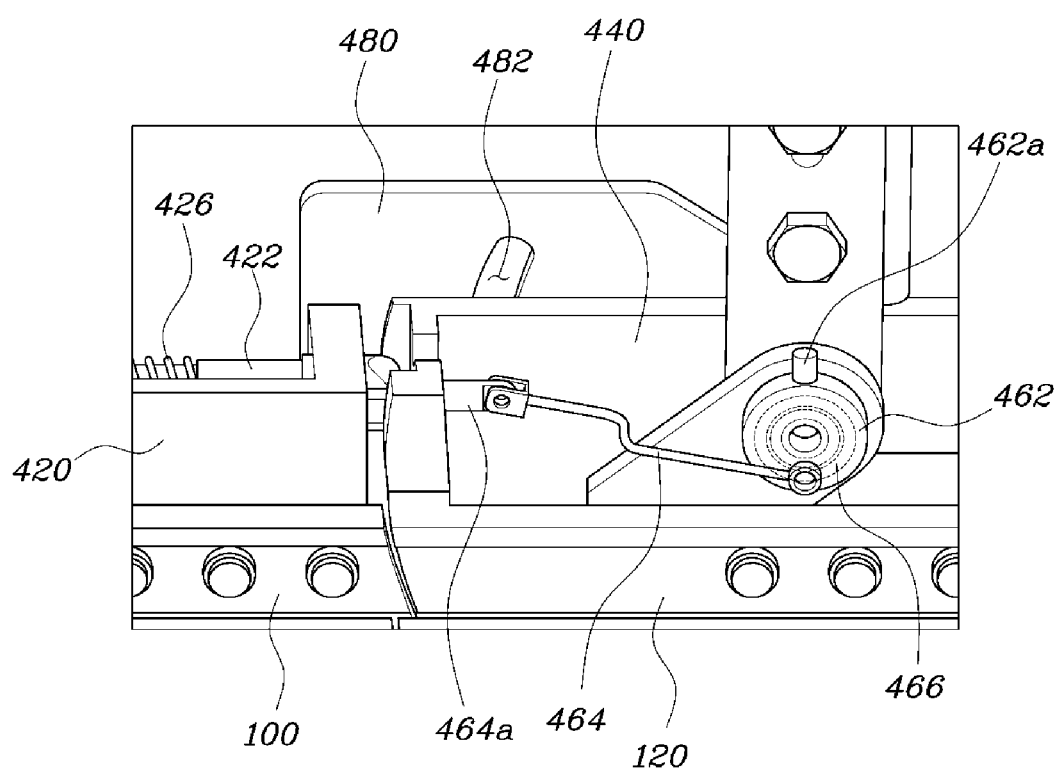

As exemplarily shown in FIGS. 3 to 5, the tilting device 400 may include a fixing bracket 420 fixed to the rear end of the guide rail 100 and including a fixing member 420 elastically supported in the backward direction, and a tilting bracket 440 installed on the guide rail 100 at the rear of the fixing bracket 420, such that rotation of the tilting bracket 440 is restricted by inserting the fixing member 422 into the tilting bracket 440, and including a tilting device 460 pushing the inserted fixing member 422 in connection with movement of the carrier device 200 so as to separate the fixing member 422 from the tilting bracket 440.

That is, the tilting device 400 includes the fixing bracket 420 and the tilting bracket 440 installed on the guide rail 100, and the fixing bracket 420 and the tilting bracket 440 are selectively connected and, if tilting of the carrier device 200 is required, connection between the fixing bracket 420 and the tilting bracket 440 is released in the withdrawn state of the carrier device 200 so as to execute tilting of the carrier device 200. Here, a tilting rail 120 which may be tilted from the guide rail 100 is provided at the rear end of the guide rail 100 and, if the carrier device 200 is withdrawn and located on the tilting rail 120, the tilting rail 120 is tilted from the guide rail 100 and thus tilts the carrier device 200. Thereby, the fixing bracket 420 may be provided on the guide rail 100 and the tilting bracket 440 may be installed on the tilting rail 120.

In more detail, a guide pin 424 extending in the forward and backward directions is fixed to the fixing bracket 420, an elastic spring 426 is provided on the guide pin 424, and the guide pin 422 passes through and is connected to the fixing member 422 so as to be elastically supported by the elastic spring 426.

That is, the guide pin 242 is fixed to the fixing bracket 40 in the forward and backward directions and passes through and is connected to the fixing member 422 so that the fixing member 422 moves along the guide pin 424. Particularly, since the elastic spring 426 is provided on the guide pin 424 and elastically supports the guide pin 424 so as to move the guide pin 424 backwards, the fixing member 422 moves towards the tilting bracket 440 and is inserted into the tilting bracket 440. Thereby, the restricted state of tilting of the carrier device 200 is maintained.

In order to execute tilting of the carrier device 200, as exemplarily shown in FIGS. 4 and 5, a tilting lever 260 extending in the sideways direction is provided at the front end of the carrier device 200, and the tilting device 460 may include a rotary lever 462 installed at a hinge pin H fixed to the tilting bracket 440 so as to be rotatable and including a push part 462a protruding and contacting the tilting lever 260 when the carrier device 200 is withdrawn from the bumper back beam 10, and a rotary link 464 having one end connected to the rotary lever 462 and the other end extending forwards and corresponding to the fixing member 422.

Here, a spiral spring 466 having one end connected to the hinge pin H and the other end connected to the inner surface of the rotary lever 462 is provided within the rotary lever 462. Thereby, as the carrier device 200 returns to an original position thereof, the rotary lever 462 returns to an original position thereof.

Further, one end of the rotary link 464 is connected to the rotary lever 462 so as to be rotatable and an operating pin 464a corresponding to the fixing member 422 is hinged to the other end of the rotary link 464. Therefore, when the rotary lever 462 is rotated, the end of the rotary link 464 connected to the rotary lever 462 is rotated and the operating pin 464a hinged to the other end of the rotary link 464 moves rectilinearly and, thus, the rotary link 464 may be effectively operated.

Here, since the operating pin 464a of the rotary link 464 is provided such that the inserted state of the operating pin 464a into the front end of the tilting bracket 440 may be maintained, even if the rotary link 464 moves in the forward and backward directions, the operating pin 464a may not be separated from the tilting bracket 440.

Through the above-described configuration, as the carrier device 200 moves during tilting of the carrier device 200, when the tilting lever 260 pushes the push part 462a of the rotary lever 462, the rotary lever 462 is rotated and moves the rotary link 464. Here, the operating pin 464a provided at the other end of the rotary link 464 pushes the fixing member 422 to separate the fixing member 422 from the tilting bracket 440 and allows the tilting bracket 440 to be rotated, thereby executing rotation of the carrier device 200.

The tilting device 400 may further include a guide bracket 480 having one end installed on the tilting bracket 440 so as to be rotatable and the other end fixed to the fixing bracket 420 and including a guide hole 482 extending in the tilting direction of the carrier device 200, and a fixing pin 442 may protrude from the side surface of the tilting bracket 440 and be inserted into the guide hole 482 of the guide bracket 480.

Therefore, in order to execute tilting of the carrier device 200, when the tilting bracket 440 is rotated, the fixing pin 442 of the tilting bracket 440 moves along the guide hole 482 of the guide bracket 480. Here, since, after the fixing pin 442 is moved by a distance corresponding to the extension length of the guide hole 482, movement of the fixing pin 442 is restricted, tilting of the carrier device 200 only to a proper level may be executed. Further, one end of the guide bracket 480 is installed on the tilting bracket 440 so as to be rotatable and, thus, the tilting bracket 440 may be smoothly rotated.

Next, control of withdrawal and tilting of the carrier device 200 through the above-described structure will be described. When a signal indicating instructions to withdraw the carrier device 200 from the bumper back beam 10 is received, the communication control module 500 may control the first driving device 300 so as to move the carrier device 200 before the tilting lever 260 of the carrier device 200 contacts the rotary lever 462 of the tilting device 460. That is, when a user inputs instructions to withdraw the carrier device 200 from the bumper back beam 10 to the communication control module 500, the communication control module 500 controls the first driving device 300 so as to move the carrier device 200 before the tilting lever 260 of the carrier device 200 contacts the rotary lever 462 of the tilting device 460, thereby maintaining the sufficiently withdrawn state of the carrier device 200 without execution of tilting of the carrier device 200.

Here, when a signal indicating instructions to tilt the carrier device 200 is received, the communication control module 500 controls the first driving device 300 in the withdrawn state of the carrier device 200 so as to further move the carrier device 200 and the tilting lever 260 of the carrier device 200 pushes the rotary lever 462 of the tilting device 460 and moves the fixing member 422. That is, when the signal indicating instructions to tilt the carrier device 200 is received in the withdrawn state of the carrier device 200, the carrier device 200 is further moved from the withdrawn state and the tilting lever 260 of the carrier device 200 pushes the rotary lever 462 of the tilting device 460. Thereby, as the rotary lever 462 is rotated, the rotary link 464 is moved and pushes the fixing member 422 inserted into the tilting bracket 440 to separate the fixing member 422 from the tilting bracket 440 and tilting of the carrier device 200 including the tilting bracket 440 is executed.

Figure 6:
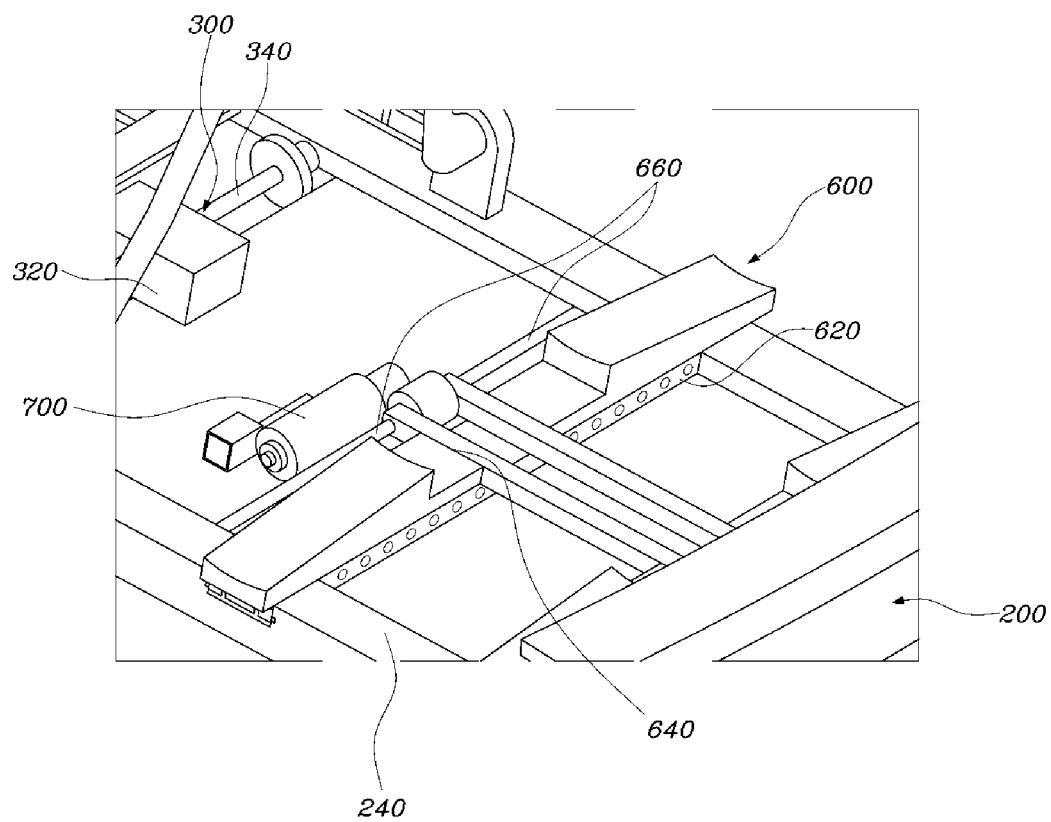
Figure 7:
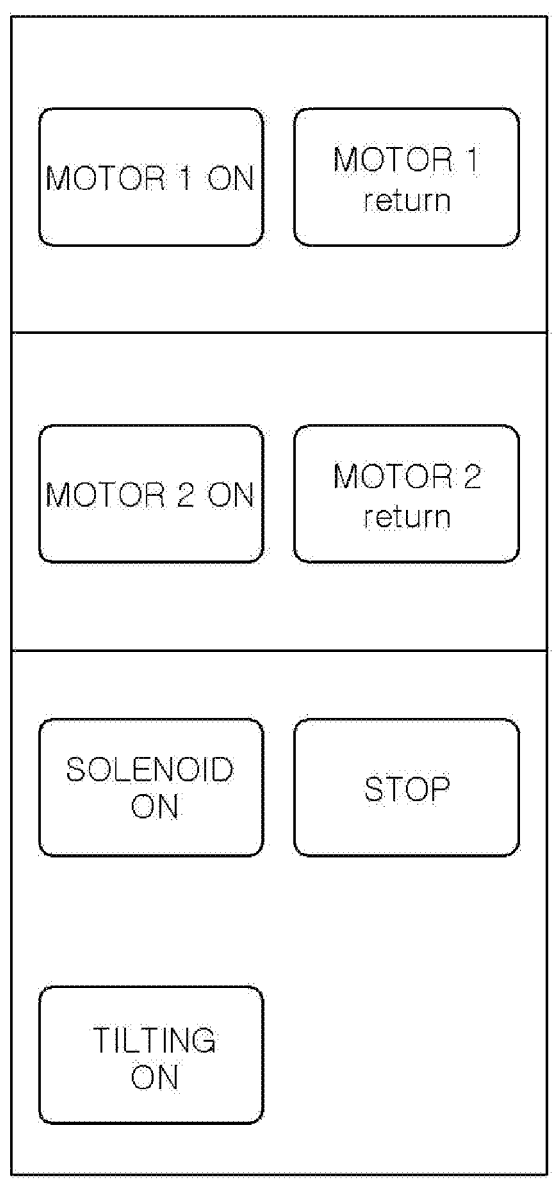

As exemplarily shown in FIG. 6, the bicycle carrier system of the present invention may further include the expandable support device 600 installed on the carrier device 200 so as to expand in both sideward directions and return to its original state such that a bicycle may be loaded thereon, and the second driving device 700 connected to the expandable support device 600 to expand the expandable support device 600.

The expandable support device 600 may include an expansion rail 620 extending in both sideward directions of the carrier device 200 and fixed, bicycle supporters 640 installed on the expansion rail 620 and sliding, and an expansion link part 660 extending in parallel with the expansion rail 620 such that the bicycle supporters 640 are connected to the expansion link part 660 so as to be movable in the extending direction, and connected to the second driving device 700 such that, during operation of the second driving device 700, the bicycle supporters 640 move along the expansion rail 620.

The expansion rail 620 extends so as to traverse both sides of the carrier device 200 and guides the bicycle supporters 640 to move the bicycle supporters 640 in both sideward directions, and the bicycle supporters 640 which are symmetrical to each other with respect to the central line in the forward and backward directions are formed in a pair and may be developed in both sideward directions to be set according to the width of a bicycle.

Here, the expansion link part 660 may include a lead screw and lead nuts into which the lead screw is inserted may be formed on the bicycle supporters 640. Thereby, the bicycle supporters 640 and the expansion link part 660 are screwed to each other and, when the expansion link part 660 is rotated according to operation of the second driving device 700, the bicycle supporters 640 may move along screw threads.

However, in the present invention, since a pair of the bicycle supporters 640, being symmetrical to each other, is formed and screw threads formed on both sides of the expansion link part 660 based on the center of the expansion link part 660 in the length direction are formed in opposite directions, although the expansion link part 660 is rotated in one direction, a pair of bicycle supporters 640 may be close to each other or far away from each other.

Therefore, the communication control module 500 stores instructions to expand the expandable support device 600 and instructions to return the expandable support device 600 to an original position thereof and, when a signal indicating instructions to expand the expandable support device 600 is received, the communication control module 500 controls the second driving device 700 so as to expand and develop the expandable support device 700. Here, the expanding operation of the expandable support device 700 is set to be executed in the withdrawn state of the carrier device 200.

The communication control module 500 may include a communication device 520 to output a signal according to specific instructions regarding the carrier device 200 and a controller 540 to receive the signal output from the communication device 520 and to selectively apply power to the first driving device 300 according to the received signal.

That is, the communication device 520 outputs a signal according to instructions from a user and transmits the corresponding signal to the controller 540 and a wireless communication device, i.e., a Bluetooth communication device, may be used as the communication device. A separate remote controller, which allows a user to spontaneously input instructions to expand the expandable support device 600 and to return the expandable support device 600 to an original position thereof as well as instructions to withdraw and receive the carrier device 200 from and in the bumper back beam 10 and instructions to tilt the carrier device 200, may be applied to the communication device 520 and, when specific instructions are input, the communication device 520 may output a signal corresponding to the instructions and transmit the signal to the controller 540.

When the controller 540 receives the signal transmitted from the communication device 520, the controller 540 may apply power to the first driving device 300 or the second driving device 700 according to the received signal, thereby executing withdrawal or insertion of the carrier device 200 from or into the bumper back beam 10 or expansion or return of the expandable support part 600.

As is apparent from the above description, in accordance with a bicycle carrier system for bicycles having the above-described structure, a carrier device 200 is installed on a bumper back beam 10 of the rear part of a vehicle, is not exposed to the outside at normal times, and is withdrawn from the bumper back beam 10 so as to load a bicycle thereon, if it is necessary to load the carrier device 200 with the bicycle is necessary, thereby maintaining the external design of the vehicle at normal times and improving convenience.

Particularly, the carrier device 200 may be automatically withdrawn from and received in the bumper back beam 10 and automatically tilted so as to easily load a bicycle thereon, thereby providing a bicycle carrier system for vehicles having improved quality and convenience.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bicycle carrier system for vehicles comprising:
   guide rails provided on a bumper back beam so as to be symmetrical to each other and extending in the forward and backward directions;
   a carrier device connected to the guide rails and configured to slide along the guide rails to be withdrawn from and received in the bumper back beam;
   a first driving device disposed on the carrier device and connected to the guide rails to move the carrier device along the guide rails in the forward and backward directions;
   tilting devices configured to selectively connect the guide rails and the carrier device to each other and to release connection between the guide rails and the carrier device so as to tilt the carrier device from the guide rails when the carrier device is moved to a designated level or higher during withdrawal of the carrier device according to operation of the first driving device; and
   a communication control module to store instructions to withdraw the carrier device from the bumper back beam, instructions to receive the carrier device in the bumper back beam and instructions to tilt the carrier device and, when a signal indicating specific instructions is received, to operate the first driving device according to the received signal so as to execute withdrawal, receipt and tilting of the carrier device.

2. The bicycle carrier system for vehicles according to claim 1, wherein:
   the guide rails extending in the forward and backward directions are provided on the bumper back beam; and
   the carrier device includes a panel part and side rails connected to the guide rails so as to be slidable and is configured to be withdrawn from and received in the bumper back beam along the guide rails.

3. The bicycle carrier system for vehicles according to claim 1, wherein the first driving device includes:
   a motor part disposed at a front end of the carrier device and configured to transmit rotation power; and
   a moving link part extending from the motor part towards the guide rails, such that extending ends of the moving link part are connected to the guide rails, and configured to slide the carrier device along the guide rails in the forward and backward directions when the motor part is operated.

4. The bicycle carrier system for vehicles according to claim 3, wherein pinion gears are formed at extending ends of the moving link part and rack gears extending in the forward and backward directions are formed on the guide rails such that the pinion gears are engaged with the rack gears.

5. The bicycle carrier system for vehicles according to claim 1, wherein the tilting device includes:
   a fixing bracket fixed to a rear end of the guide rail and including a fixing member elastically supported in the backward direction; and
   a tilting bracket disposed on the guide rail at a rear of the fixing bracket, such that rotation of the tilting bracket is restricted by inserting the fixing member into the tilting bracket, and including a tilting device configured to push the inserted fixing member in connection with movement of the carrier device so as to separate the fixing member from the tilting bracket.

6. The bicycle carrier system for vehicles according to claim 5, wherein a guide pin extending in the forward and backward directions is fixed to the fixing bracket, an elastic spring is provided on the guide pin, and the guide pin passes through and is connected to the fixing member so as to be elastically supported by the elastic spring.

7. The bicycle carrier system for vehicles according to claim 5, wherein:
   a tilting lever extending in a sideways direction is provided at a front end of the carrier device; and
   the tilting device includes a rotary lever disposed at a hinge pin fixed to the tilting bracket so as to be rotatable and including a push part protruding and contacting the tilting lever when the carrier device is withdrawn, and a rotary link having a first end connected to the rotary lever and a second end extending forwards and corresponding to the fixing member.

8. The bicycle carrier system for vehicles according to claim 7, wherein a spiral spring having a first end connected to the hinge pin and a second end connected to an inner surface of the rotary lever is provided within the rotary lever.

9. The bicycle carrier system for vehicles according to claim 7, wherein a first end of the rotary link is connected to the rotary lever so as to be rotatable and an operating pin corresponding to the fixing member is hinged to a second end of the rotary link.

10. The bicycle carrier system for vehicles according to claim 9, wherein the operating pin of the rotary link is provided such that an inserted state of the operating pin into the front end of the tilting bracket may be maintained.

11. The bicycle carrier system for vehicles according to claim 7, wherein the communication control module is configured to control the first driving device so as to move the carrier device before the tilting lever of the carrier device contacts the rotary lever of the tilting device when a signal indicating the instructions to withdraw the carrier device from the bumper back beam is received.

12. The bicycle carrier system for vehicles according to claim 11, wherein the communication control module is configured to control the first driving device in the withdrawn state of the carrier device so as to further move the carrier device when a signal indicating the instructions to tilt the carrier device is received, and thus, the tilting lever of the carrier device pushes the rotary lever of the tilting device and moves the fixing member.

13. The bicycle carrier system for vehicles according to claim 5, wherein:
the tilting device further includes a guide bracket having a first end disposed on the tilting bracket so as to be rotatable and a second end fixed to the fixing bracket, and including a guide hole extending in a direction of the tilting of the carrier device; and
a fixing pin protrudes from a side surface of the tilting bracket and is inserted into the guide hole of the guide bracket.

14. The bicycle carrier system for vehicles according to claim 1, further comprising:
an expandable support device disposed on the carrier device so as to expand in both sideways directions and to return to its original state such that a bicycle may be loaded thereon; and
a second driving device connected to the expandable support device to expand the expandable support device.

15. The bicycle carrier system for vehicles according to claim 14, wherein the expandable support device includes:
an expansion rail extending in both sideways directions of the carrier device and fixed;
bicycle supporters disposed on the expansion rail and sliding; and
an expansion link part extending in parallel with the expansion rail such that the bicycle supporters are connected to the expansion link part to be movable in the extending direction, and connected to the second driving device such that, during operation of the second driving device, the bicycle supporters move along the expansion rail.

16. The bicycle carrier system for vehicles according to claim 14, wherein the communication control module stores instructions to expand the expandable support device and instructions to return the expandable support device to an original position thereof and, when a signal indicating instructions to expand the expandable support device is received, the communication control module is configured to control the second driving device so as to expand and develop the expandable support device.

17. The bicycle carrier system for vehicles according to claim 1, wherein the communication control module includes:
a communication device configured to output a signal according to specific instructions regarding the carrier device; and
a controller configured to receive the signal output from the communication device and to selectively apply power to the first driving device according to the received signal.

* * * * *